(12) United States Patent
Schimpf et al.

(10) Patent No.: US 6,927,775 B2
(45) Date of Patent: Aug. 9, 2005

(54) PARALLEL BOX FILTERING THROUGH REUSE OF EXISTING CIRCULAR FILTER

(75) Inventors: Michael W. Schimpf, Pacific Grove, CA (US); Yan Yan Tang, Mountain View, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 95 days.

(21) Appl. No.: 10/377,924

(22) Filed: Mar. 3, 2003

(65) Prior Publication Data

US 2004/0174368 A1 Sep. 9, 2004

(51) Int. Cl.[7] .............................................. G06F 15/16
(52) U.S. Cl. ........................ 345/503; 345/537; 345/545; 345/557; 345/611; 345/613; 345/614
(58) Field of Search ................................. 345/611, 613, 345/614, 615, 503, 520, 531, 537, 545, 557

(56) References Cited

U.S. PATENT DOCUMENTS

| | | | | |
|---|---|---|---|---|
| 6,204,859 B1 | * | 3/2001 | Jouppi et al. | 345/592 |
| 6,259,460 B1 | * | 7/2001 | Gossett et al. | 345/552 |
| 6,549,210 B1 | * | 4/2003 | Van Hook et al. | 345/561 |
| 6,756,993 B2 | * | 6/2004 | Popescu et al. | 345/646 |
| 2001/0055025 A1 | * | 12/2001 | Deering et al. | 345/611 |
| 2002/0005862 A1 | * | 1/2002 | Deering | 345/694 |
| 2003/0189578 A1 | * | 10/2003 | Alcorn et al. | 345/629 |
| 2004/0001067 A1 | * | 1/2004 | Toksvig et al. | 345/531 |

* cited by examiner

Primary Examiner—Ulka J. Chauhan
(74) Attorney, Agent, or Firm—Meyertons Hood Kivlin Kowert & Goetzel, P.C.

(57) ABSTRACT

A sample filtering system and method for concurrently filtering sample data for two or more sequential pixels (in a scan-line) are disclosed. The system may include a sample cache, a control register, a read cache controller, and a sample-to-pixel calculation unit. The read cache controller reads a first set of S samples from the sample cache, and outputs a second set of S samples to the sample-to-pixel calculation unit. The second set of samples may have one or more subsets of samples, with each subset of samples selected to cover the filter region for one of the sequential pixels. The sample-to-pixel calculation unit may process each subset separately and concurrently.

27 Claims, 15 Drawing Sheets

PARALLEL BOX FILTERING THROUGH REUSE OF EXISTING CIRCULAR FILTER

BACKGROUND OF THE INVENTION

1. Field of the Invention

This invention relates generally to the field of high performance computer graphics systems and, more particularly, to sample-to-pixel filtering systems.

2. Description of the Related Art

In recent years, the demand for high performance graphics systems that can render complex three-dimensional (3D) objects and scenes realistically has increased substantially. Modem high performance graphics systems also support special effects such as anti-aliasing, texturing, shading, fogging, alpha-blending, and specular highlighting. The increase in demand for better performance is at least in part due to new applications such as computer-generated animation for motion pictures, virtual reality simulators/trainers, and interactive computer games. These new applications place tremendous computational loads upon graphics systems. Modem computer displays have also improved and have a significantly higher pixel resolution, greater color depth, and are able to display more complex images with higher refresh rates than earlier models. Consequently, modern high performance graphics systems incorporate graphics processors with a great deal of complexity and power that generate multiple samples per pixel, and the color value of one pixel may be the result of many calculations involving filtering hundreds of samples.

With each new generation of graphics system, there is more image data to process, the processing is more complex, and there is less time in which to process it. This need for more processing power is being met with the combination of more hardware resources and more efficient processes.

SUMMARY

One embodiment of the invention comprises a high-speed graphics system that utilizes a sample filtering system and method for concurrently filtering sample data for two or more sequential pixels (in a scan-line). The system may include a sample cache, a control register, a read cache controller, and a sample-to-pixel calculation unit. A sample may include data for one or more of colors, transparency, depth, and location.

The method may be initiated by selecting a filter type and a filter region, setting a control register to a value that enables concurrent filtering of P sequential pixels, where P is a positive integer, and identifying an array of sample bins in the sample cache that overlap the P filter regions centered on the P sequential pixel locations.

The sample cache stores sample data from a sample buffer in an array of sample bins. The control register specifies a number P of sequential pixels to filter concurrently. If the control register is set to a first value, the sample-to-pixel calculation unit may filter one pixel at a time and may use a specified filter of larger width. If the control register is set to a second value, the sample-to-pixel calculation unit may filter two sequential pixels concurrently and may use a filter of smaller width for each pixel. The control register may also be set to other values that select more than two sequential pixels to be filtered sequentially.

The read cache controller reads a first set of samples from the sample cache, and outputs a second set of S samples to the sample-to-pixel calculation unit. The second set of S samples may comprise P subsets of samples, with each subset of samples selected to cover the filter region for a corresponding one of the P pixels.

The sample-to-pixel calculation unit may include a sample weight calculation unit, a filter multiplier tree, a weight accumulator, and one or more pixel normalizers.

The sample weight calculation unit may determine sample weights for each of the S sample locations as a function of one or more of the distance between the sample location and the corresponding pixel location, the specified filter type, and the specified filter region. If a sample location is outside a specified filter region, the sample weight may be set to zero. In some embodiments, the sample data read from the sample cache may not include sample locations. Sample locations may be specified according to a pre-selected pattern of sample positions (such as a regular grid, a perturbed regular grid, a stochastic grid, or a specified permutation of a stored set of selected sample locations).

The filter multiplier tree receives one or more cycles of S samples grouped in P subsets from the sample cache reader and corresponding S weights from the sample weight calculation unit, multiplies each sample by the corresponding weight, sums the weighted samples for each subset of samples, and adds the sum to an accumulated sum from prior cycles for each subset. (The number of cycles is a function of the specified number of samples per pixel.) When processing one pixel at a time, the normal input of S samples may be received, processed, and accumulated. When processing two pixels concurrently, two subsets may be received. A multiplexer separates the filter multiplier tree into two separate units. The two subsets of samples may then be processed and accumulated separately.

The weight accumulator may receive one or more cycles of S weights from the sample weight calculation unit in P subsets, accumulate a weight sum for the one or more cycles, and calculate a reciprocal of the accumulated weight sum for each subset.

One or more pixel normalizers may receive the accumulated sum of the weighted samples from the filter multiplier tree and the reciprocal of the accumulated weight sum from the weight accumulator and output the product as a pixel value for each subset. In some embodiments, one normalizer may be used to output the pixel values in sequence. In other embodiments, P normalizers may be used to output the pixel values concurrently.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
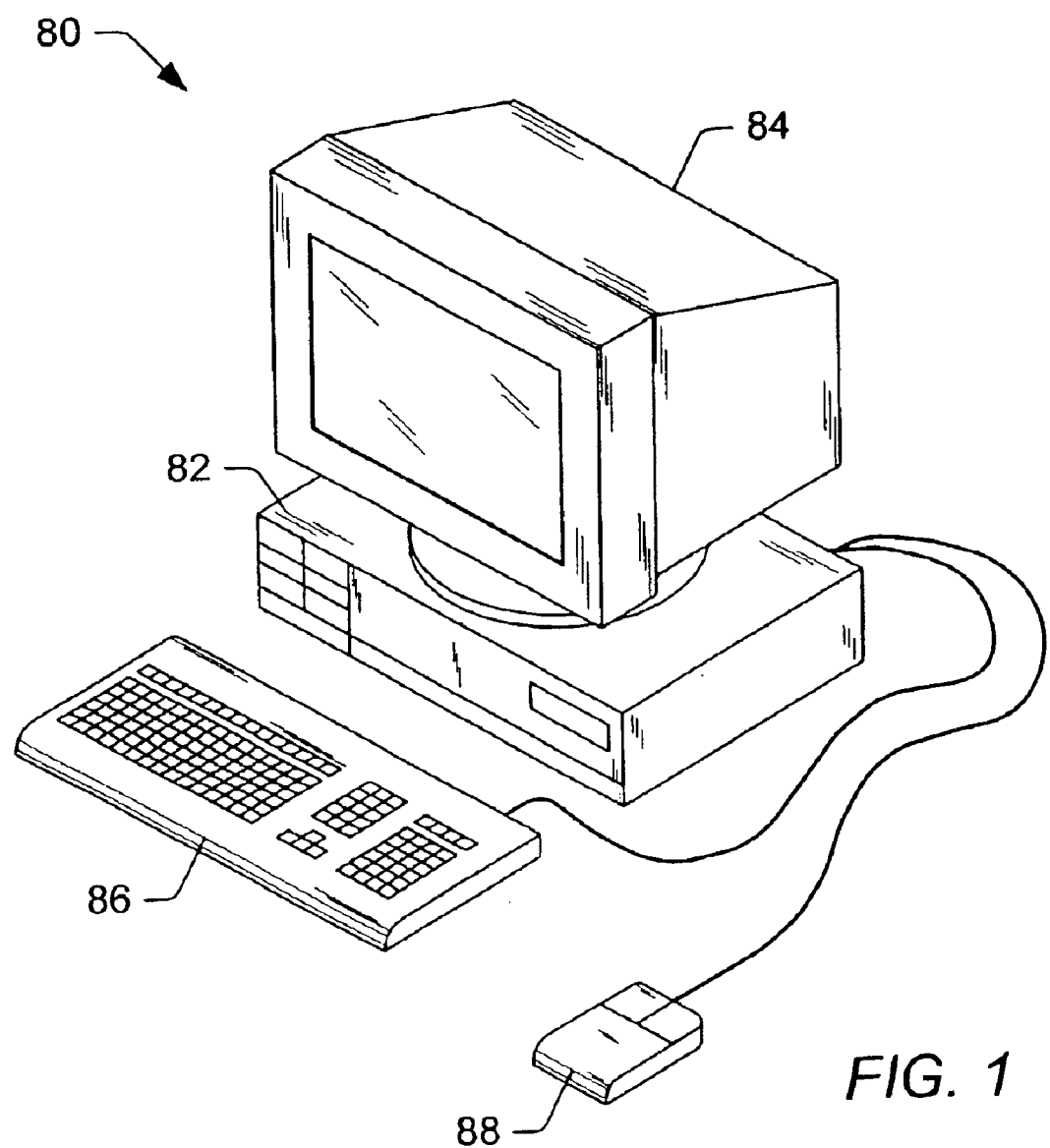
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices that display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
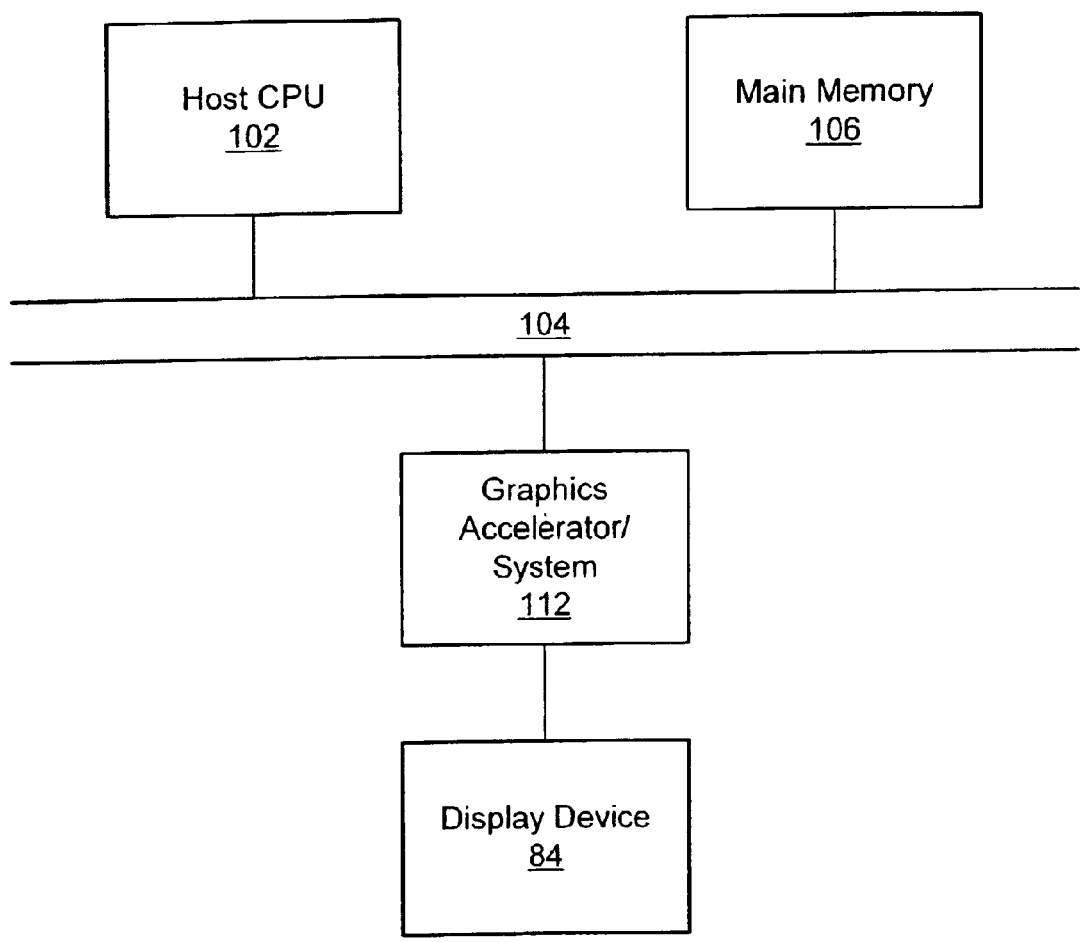
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
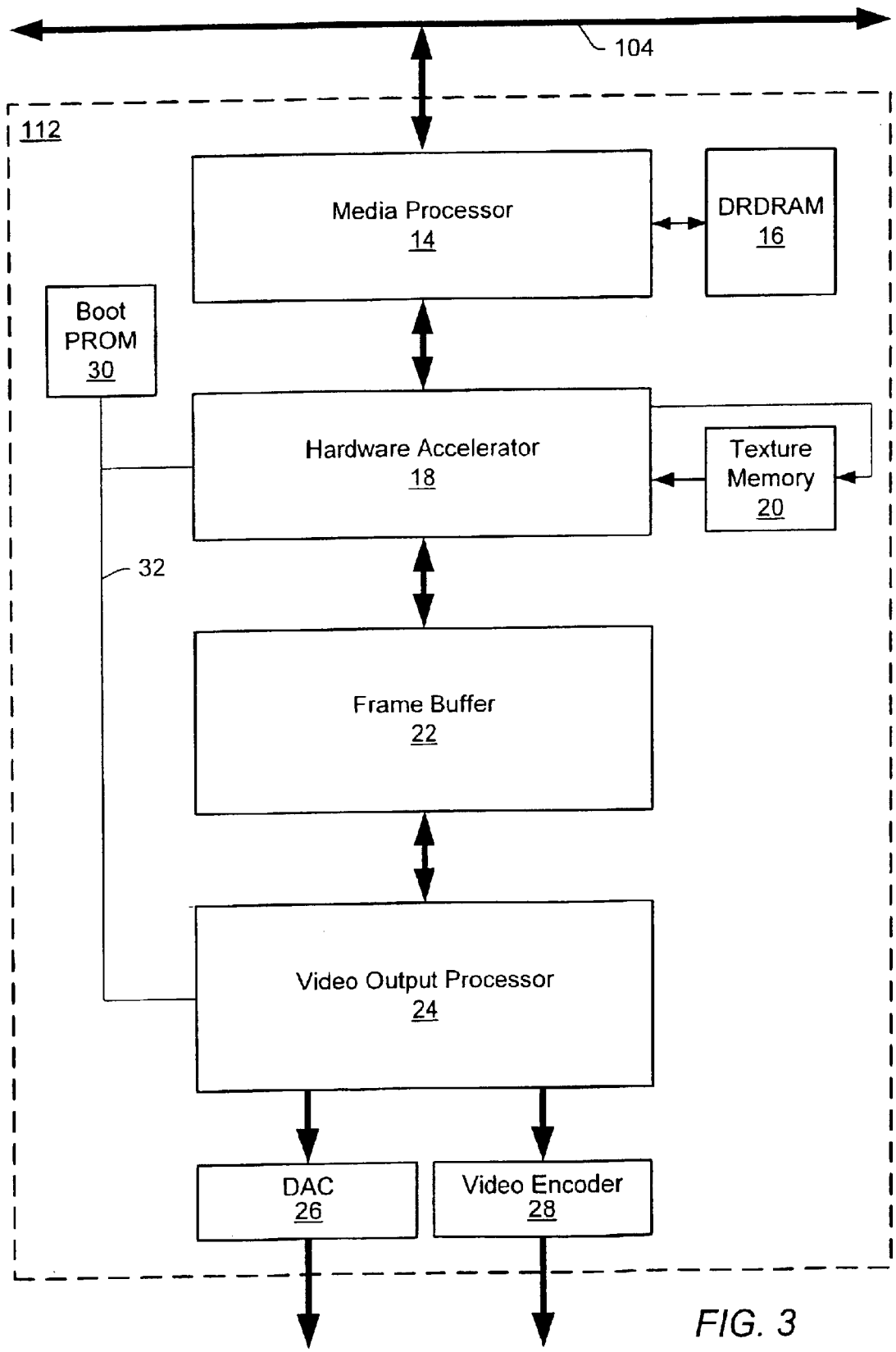
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
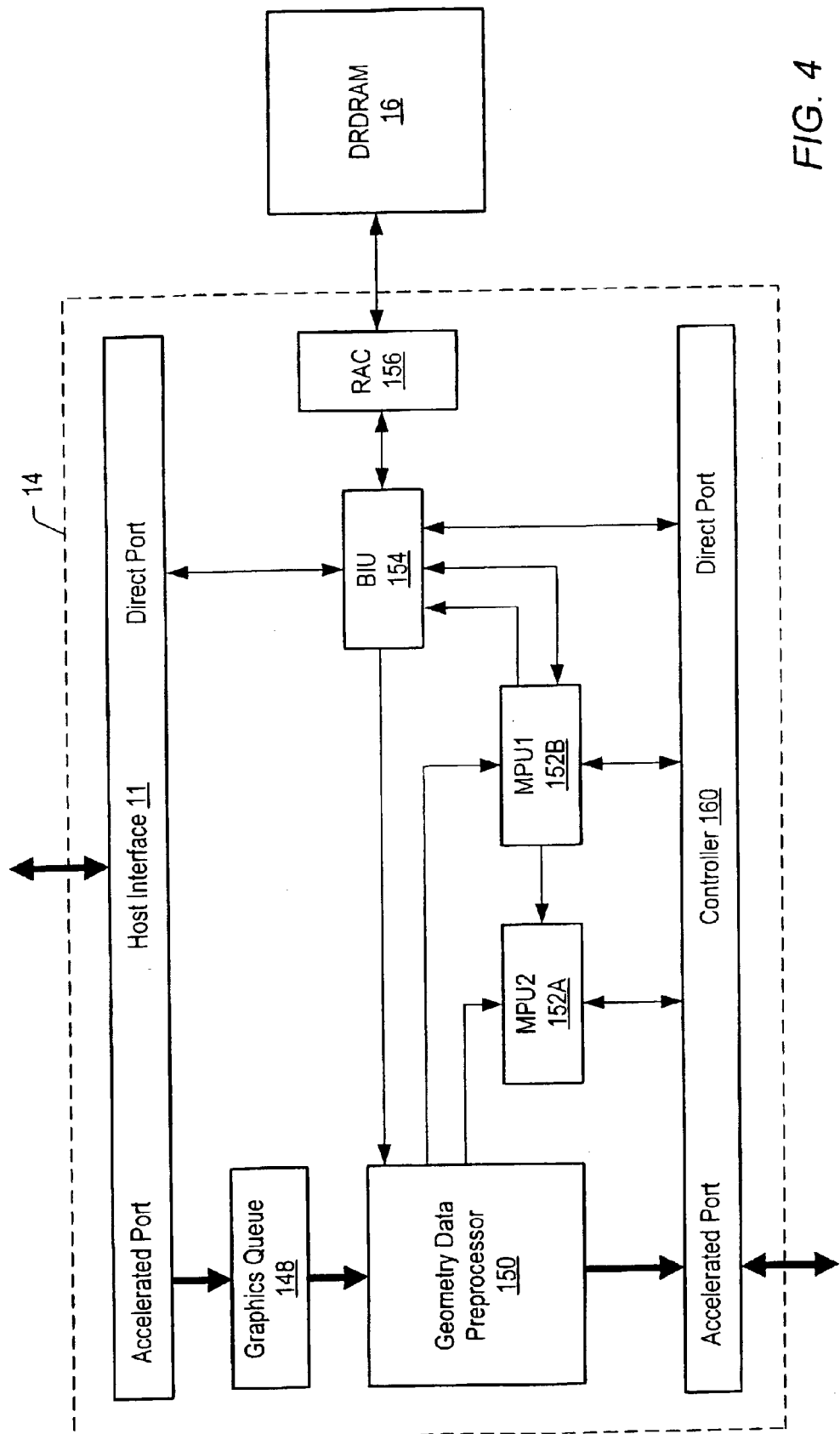
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappings (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
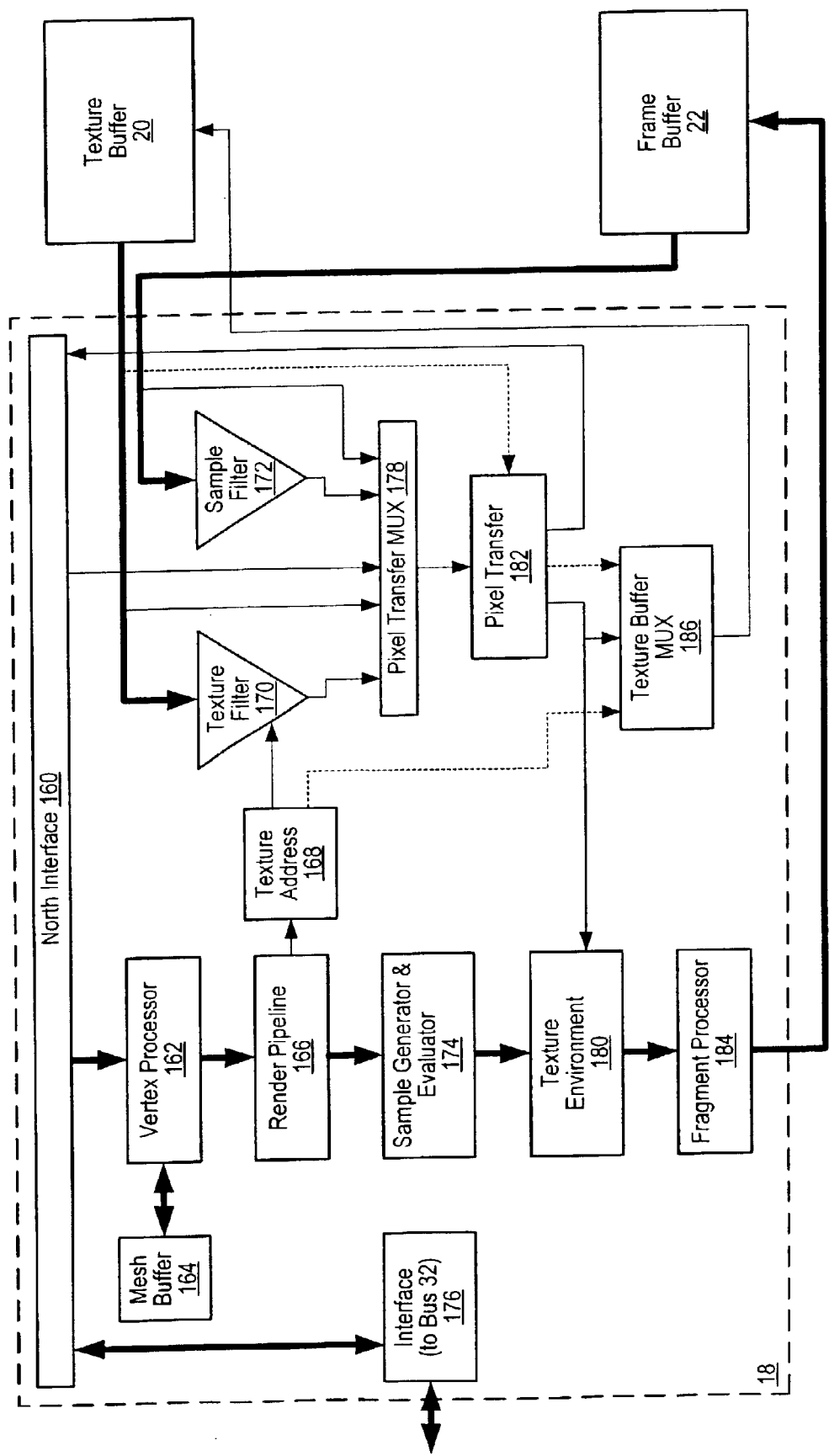
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e. transparency);

z (i.e. depth); and s, t, r, and w (i.e. texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple 3D-RAM memory devices (e.g. 3D-RAM64 memory devices) manufactured by Mitsubishi Electric Corporation. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and sample buffer.

Figure 6:
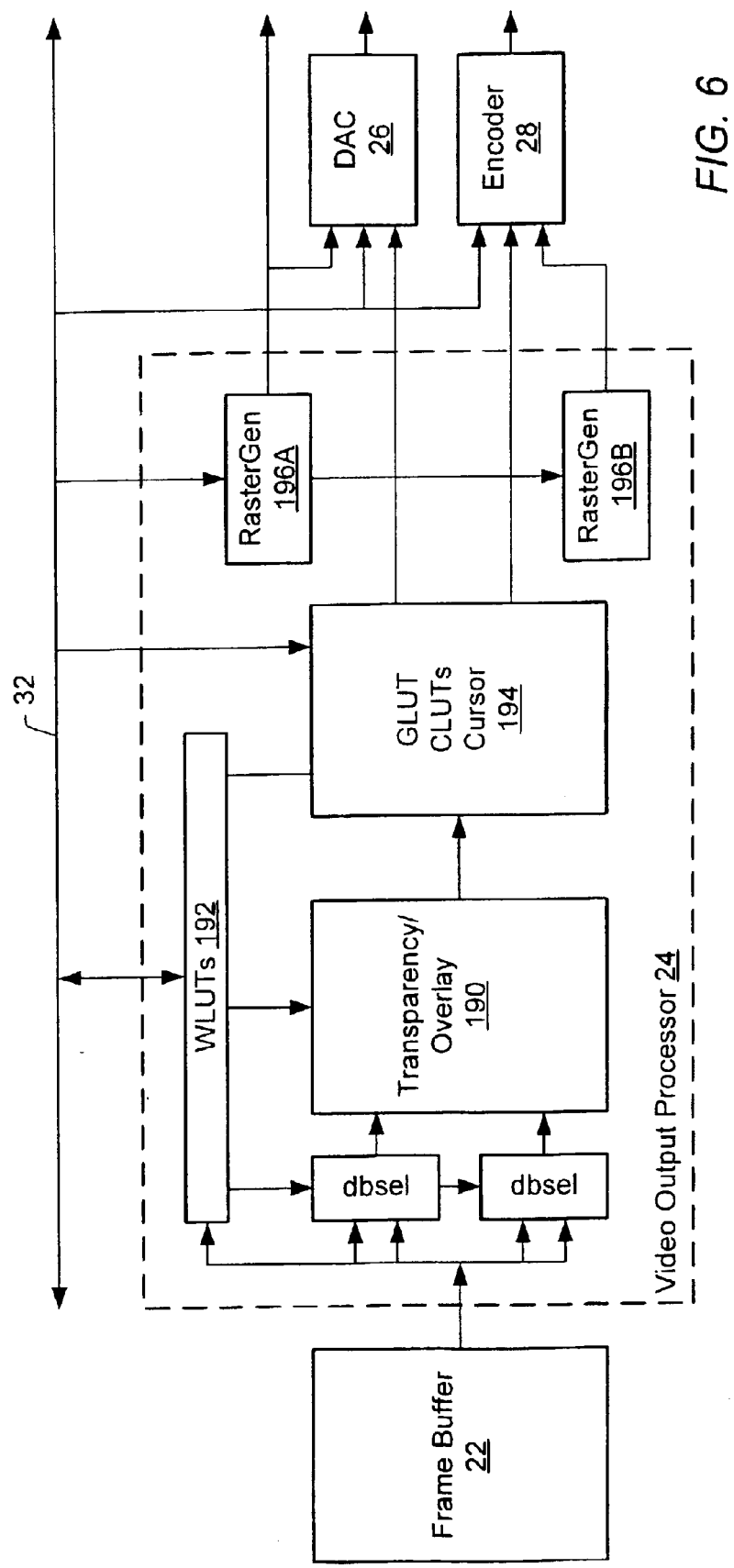
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

In one set of embodiments, hardware accelerator 18 may receive geometric parameters defining primitives such as triangles from media processor 14, and render the primitives in terms of samples. The samples may be stored in a sample buffer portion of frame buffer 22 (also referred to as sample buffer 40 or super-sample buffer 40). The samples are then read from the sample buffer 40 and filtered by sample filter 172 to generate pixels. The pixels are stored in a pixel storage portion of frame buffer 22. The pixel storage portion may be double-buffered. Video output processor 24 reads the pixels from frame buffer 22 and generates a video stream from the pixels. The video stream may be provided to one or more display devices (e.g. monitors, projectors, head-mounted displays, and so forth) through DAC 26 and/or video encoder 28.

Figure 7:
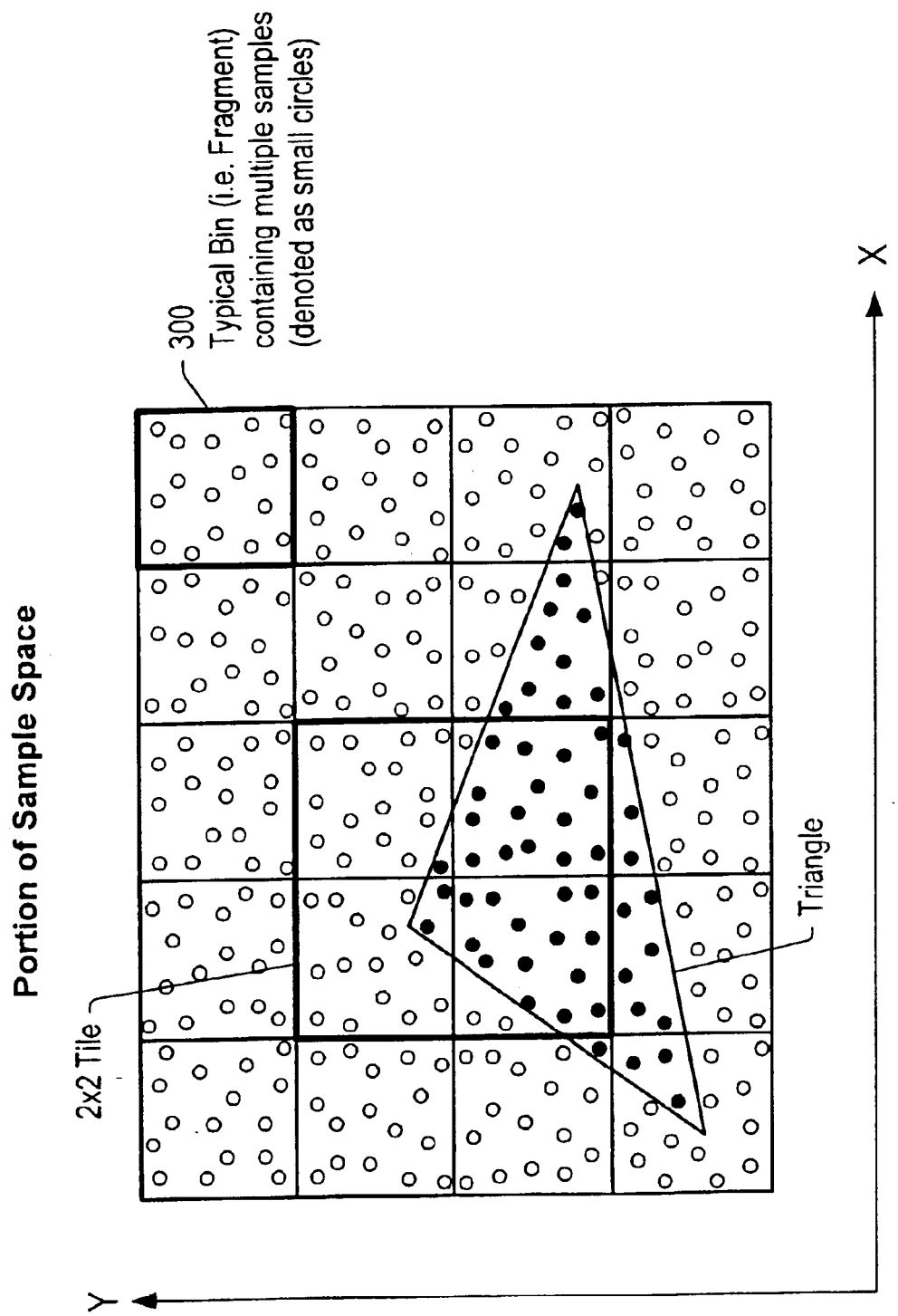
FIG. 7 is an illustration of sample space partitioned into an array of bins.

The samples are computed at positions in a two-dimensional sample space (also referred to as rendering space). The sample space may be partitioned into an array of bins (also referred to herein as fragments). The storage of samples in the sample buffer 40 may be organized according to bins (e.g. bin 300) as illustrated in FIG. 7. Each bin may contain one or more samples. The number of samples per bin may be a programmable parameter.

Figure 8:
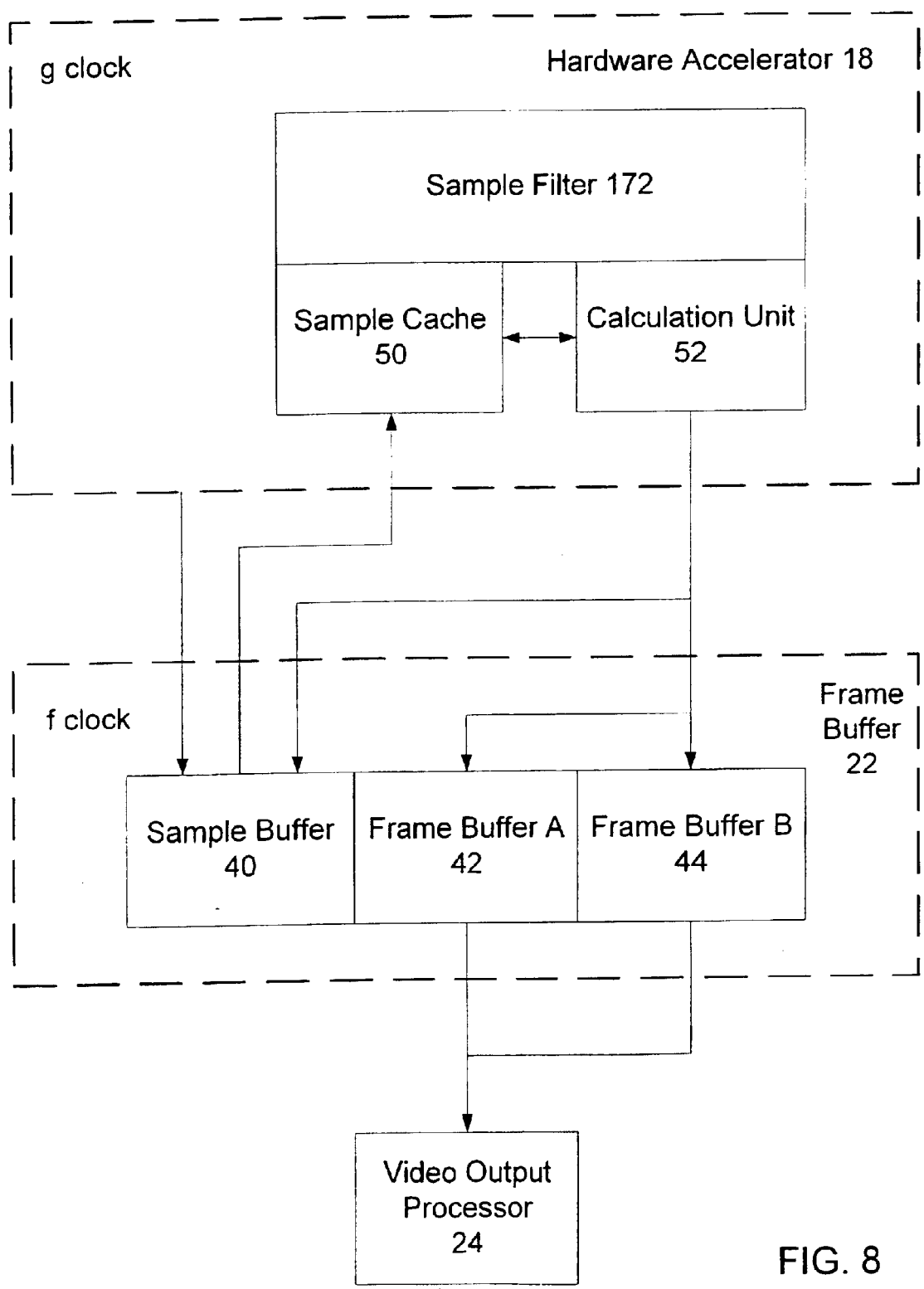
FIG. 8 is a block diagram of one embodiment of the hardware accelerator and the frame buffer of FIG. 3 illustrating more details of sample processing hardware.
Figure 9:
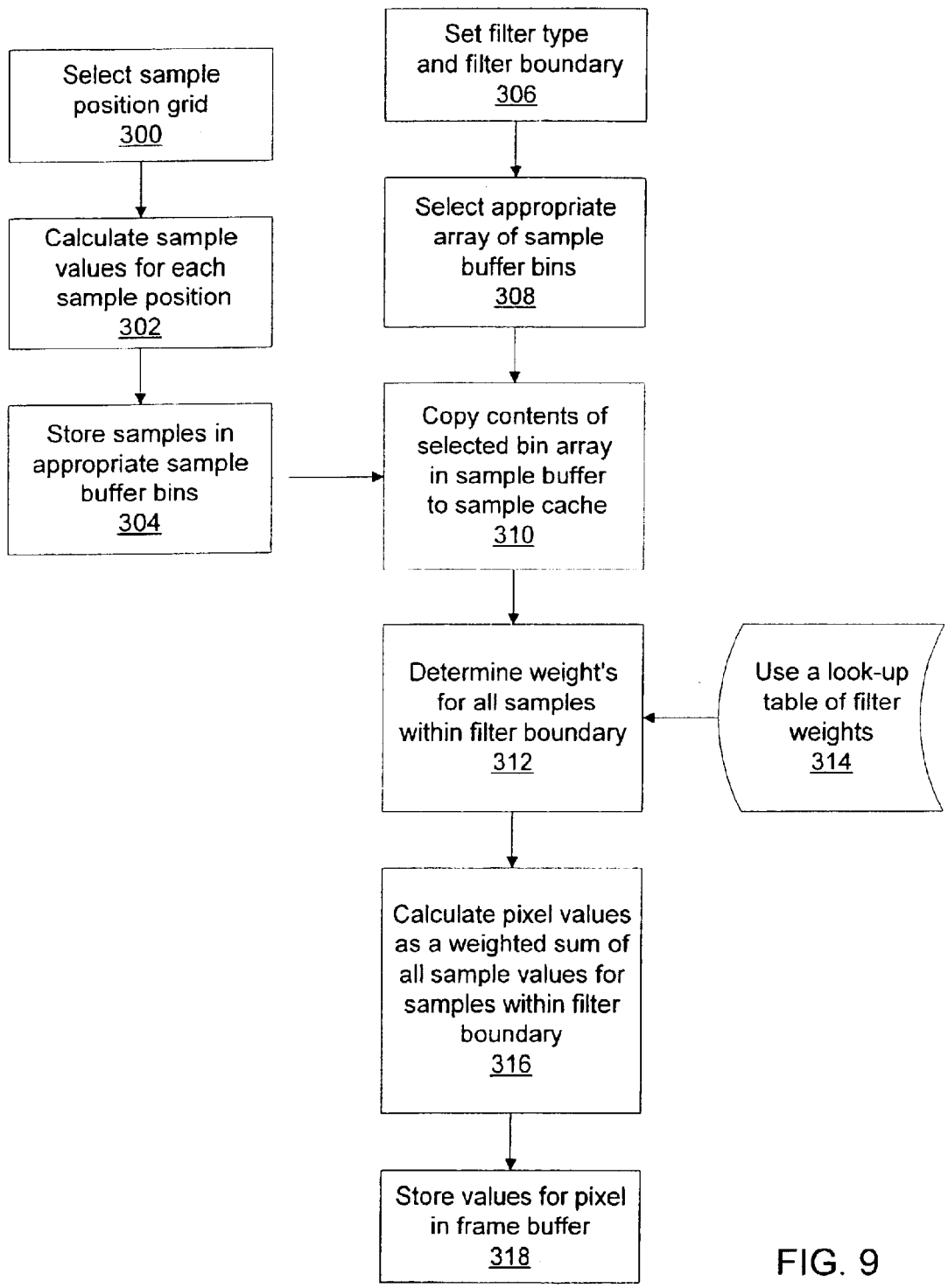
FIG. 9 is a flowchart of one embodiment of a method for filtering sample values to obtain pixel values.

Super-Sampling with Sample Cache—FIGS. 8 and 9

One embodiment of super-sampling hardware is shown in FIG. 8. The frame buffer 22 is segmented into 3 portions: a sample buffer 40, a frame buffer A 42, and a frame buffer B 44. The hardware accelerator 18 has subsections comprising a sample filter 172, a sample cache 50, and a sample-to-pixel calculation unit 52.

In one embodiment, 8 copies of 96 deep, 30 bit wide, two read and two write addressable memories are used as the sample cache 50 to store the 30 bit samples read out from the sample buffer 40. Other semiconductor memory types including SRAM, SDRAM, RDRAM, SGRAM, VRAM, 3D-RAM, or 3D-RAM 64 are possible and contemplated for the sample cache 50. The sample cache 50 acts as temporary storage for the sample data while the sample-to-pixel calculation unit 52 filters the sample data together (the sample-to-pixel calculation unit may also be referred to as a calculation unit). The sample cache 50 also resides at the transition from an f clock rate (clock rate for the frame buffer 22) to a g clock rate (clock rate for the hardware accelerator 18), and therefore may act as the interface between the 2 clock domains. Since the sample cache 50 and the sample-to-pixel calculation unit 52 both operate at the higher g clock rate the time required to filter many samples into one pixel may be reduced.

One embodiment of a method that uses a super-sample approach for rendering objects is illustrated by the flowchart in FIG. 9. The hardware accelerator 18 selects a sample position grid (step 300), calculates sample values for each sample position (step 302), stores the sample values in the appropriate bins in the sample buffer 40 (step 304), and sets the filter type and filter boundary (step 306). Sample filter 172 may select an appropriate array of bins in the sample buffer 40 to accommodate the filter type and extent (step 308) and copy the contents of the bin array to the sample cache 50 (step 310). The sample-to-pixel calculation unit 52 may determine relative weights for the samples that are within the filter extent (step 312), possibly by using look-up tables (step 314), and calculate pixel values as a weighted sum of the sample values of the samples selected (step 316). The sample filter 172 may store the pixel values in the appropriate memory address in the frame buffer A 42 or frame buffer B 44, depending on which buffer is being used by the video output processor 24 (step 318).

Sample Filtering—FIGS. 10a,10b,10c,11a,& 11b

There may be a plurality of samples for each pixel of display space, and therefore a filtration process (also referred to as a convolution or calculation process) may be utilized to determine the color values for each pixel. This process may include the steps of selecting a filter type, defining a region of sample space for each filter type, calculating a relative weight for each sample included in the selected region, and summing the weighted color values for all the included samples.

The filter center corresponds to the location of the pixel to be evaluated. The samples that are within the filter's extent may potentially contribute to the color values of the pixel. A square grid subdivides sample space, where each grid square defines a bin. A bin may have an area corresponding to the size of one pixel and may include multiple samples, but other configurations are also possible and contemplated. Each sample may be weighted according to a selected filter function. Filter weights may also be interpolated from a lookup table. A filter size may vary to include samples from 1 to 25 bins. A 5×5 array of bins with 16 samples per bin may involve up to 400 samples in the calculation to determine a single pixel's color values. Other filter size ranges are possible and contemplated.

Figure 10A:
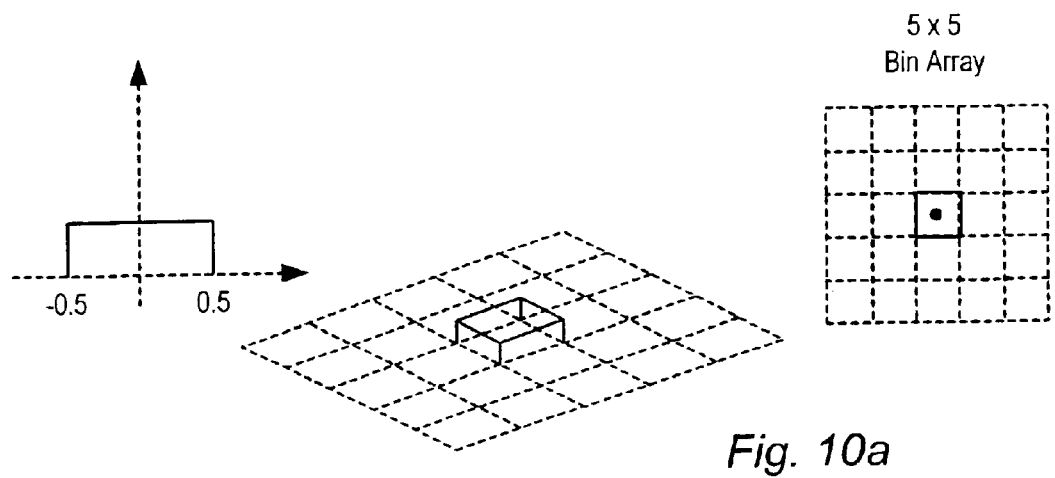
FIGS. 10a, 10b, & 10c are representations of several embodiments of smaller width filters used to calculate pixel values from super-samples.
Figure 10B:
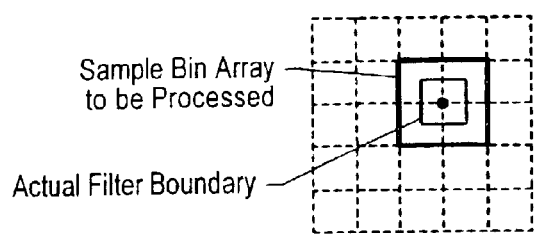
Figure 10C:
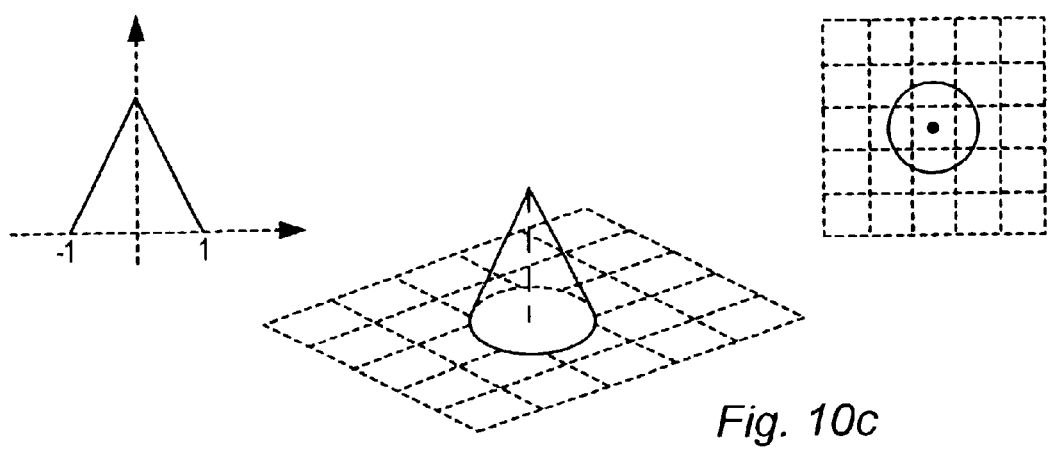
Figure 11A:
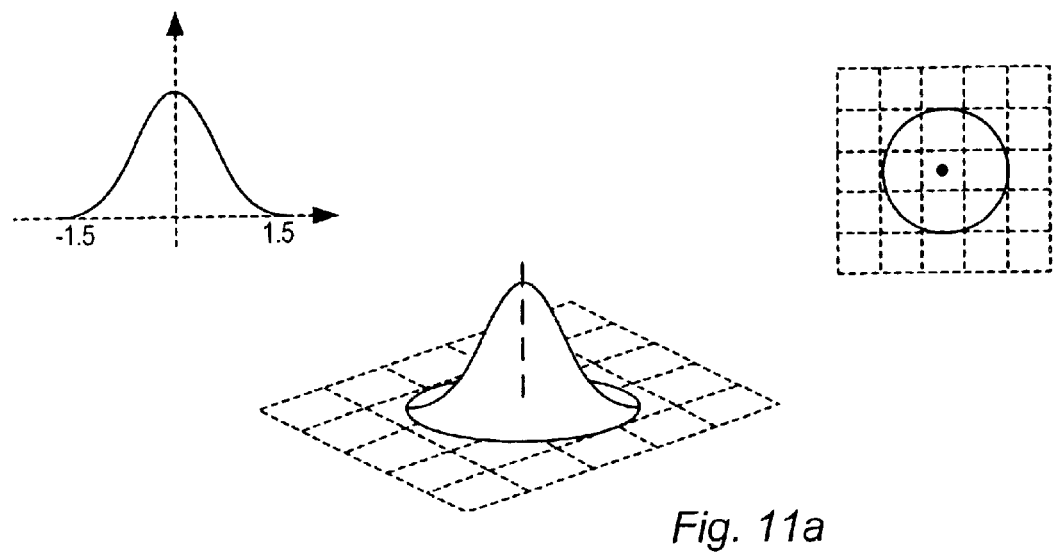
FIGS. 11a, & 11b are representations of two embodiments of larger width filters used to calculate pixel values from super-samples.
Figure 11B:
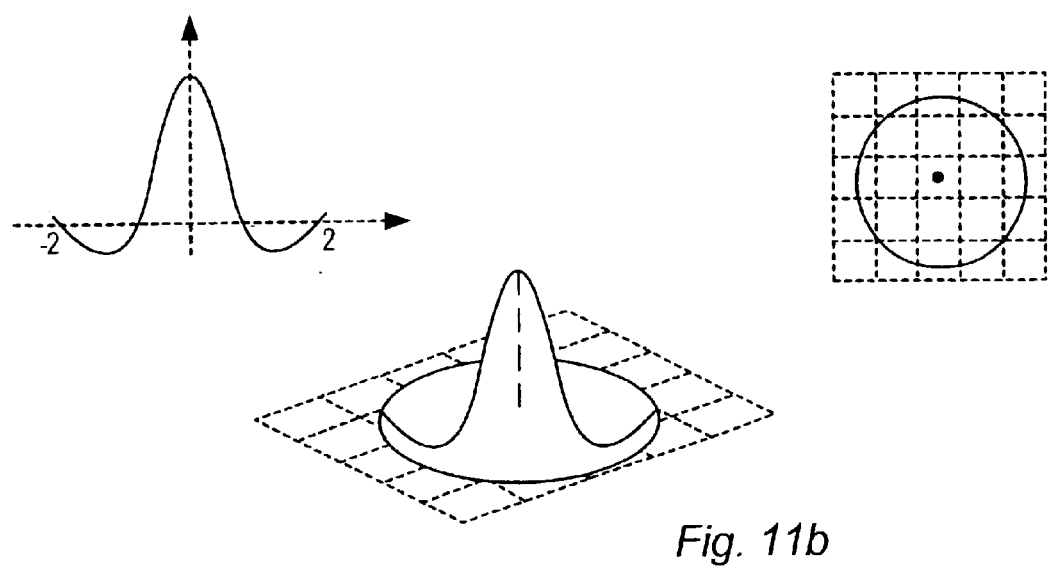

FIGS. 10a,10b,10c,11a,& 11b provide details of four examples of filter types that may be utilized to determine the color values for each pixel. FIG. 10a details a box filter with an area of one bin. Each sample inside the filter is weighted equally with a weight of 1/n, where n is the number of samples per bin. The pixel location may be offset from a bin center. In this case, the filter may need to consider samples from a 2×1, a 1×2,or a 2×2 bin array (as depicted in FIG. 10b). FIG. 10c details a cone filter, where the weight of each sample increases linearly towards the center of the filter region. In this example, the filter includes samples from within a 3×3 bin area. The Gaussian filter, shown in FIG. 11a, provides a smooth bell-shaped curve for sample weights. In the example shown in the figure, the filter includes samples from within a 3×3 bin area. If the pixel location is offset from a bin center, however, a larger 4×4 array of bins may be utilized. The sinc filter shown in FIG. 11b provides higher quality filtering at a higher cost, since it involves a larger number of samples. This filter includes samples from a 5×5 bin area. Other filter types are possible and contemplated.

The filter calculates the distance d between the filter center and the sample point. If d is greater than the filter radius, then the weight may be set equal to zero. If d is less than the filter radius, the sample weight may be set equal to a value interpolated from lookup tables of tabulated values for the specific filter function, or calculated directly from a functional expression relating a weight value to the distance d between the filter center and the sample point. The filter calculations may use approximations for the distance to improve throughput, and in some embodiments, the filter calculations may use $d^2$ in lieu of d to improve calculation times (the lookup tables would be tabulated for values of $d^2$).

Figure 12:
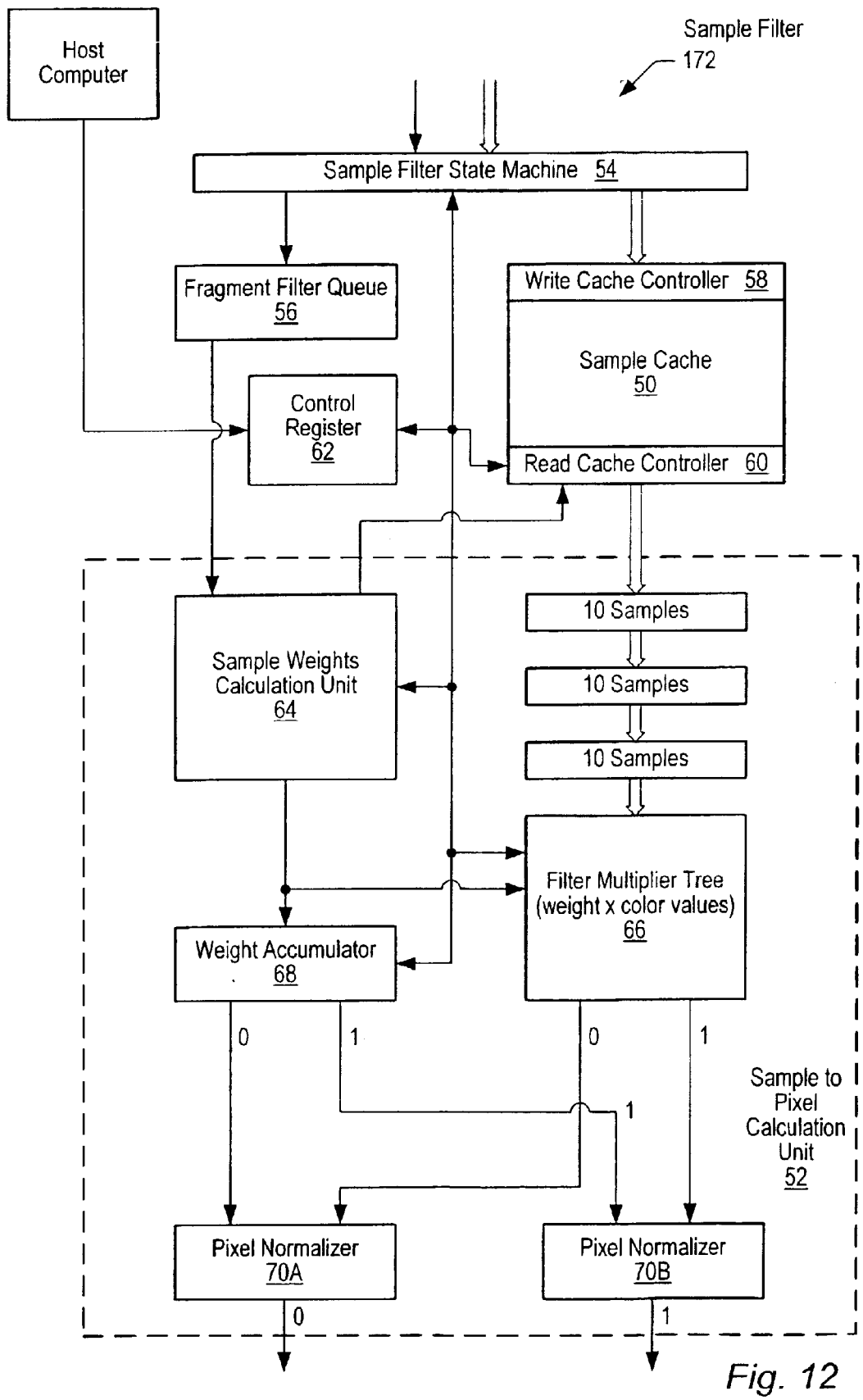
FIG. 12 is a conceptual block diagram of one embodiment of a sample filter.
Figure 13A:
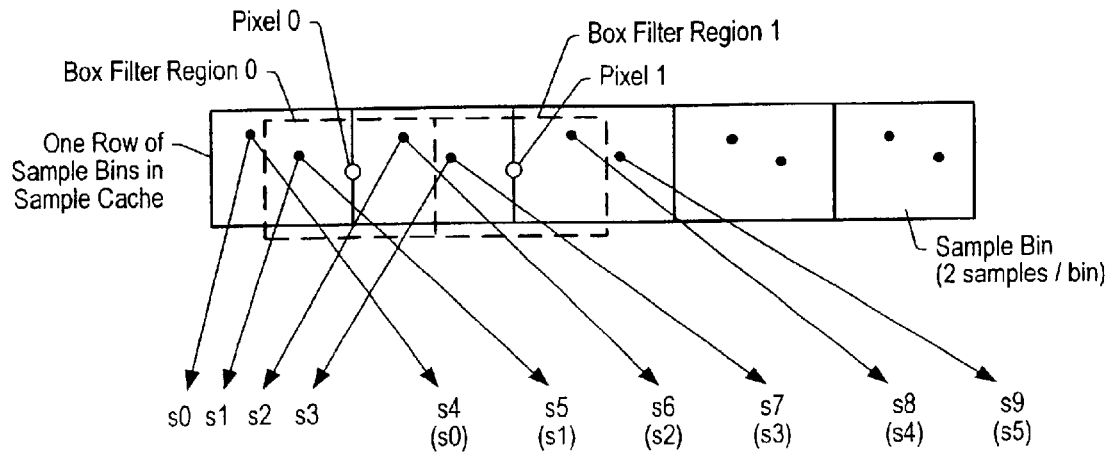
FIGS. 13a and 13b illustrates the method for converting a first set of 10 samples into a second set of 10 samples with 2 subsets.
Figure 13B:
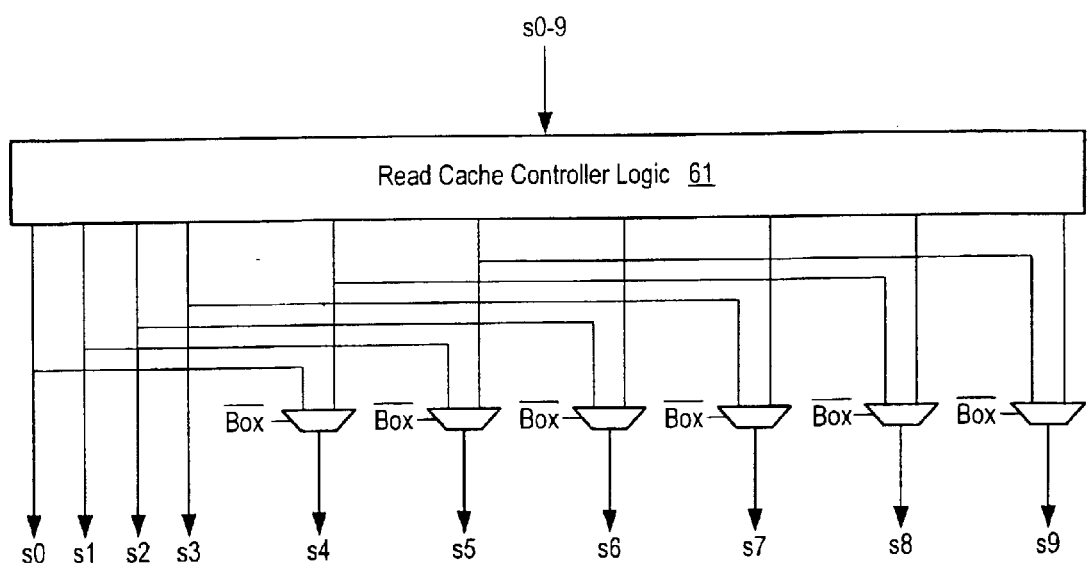
Figure 14:
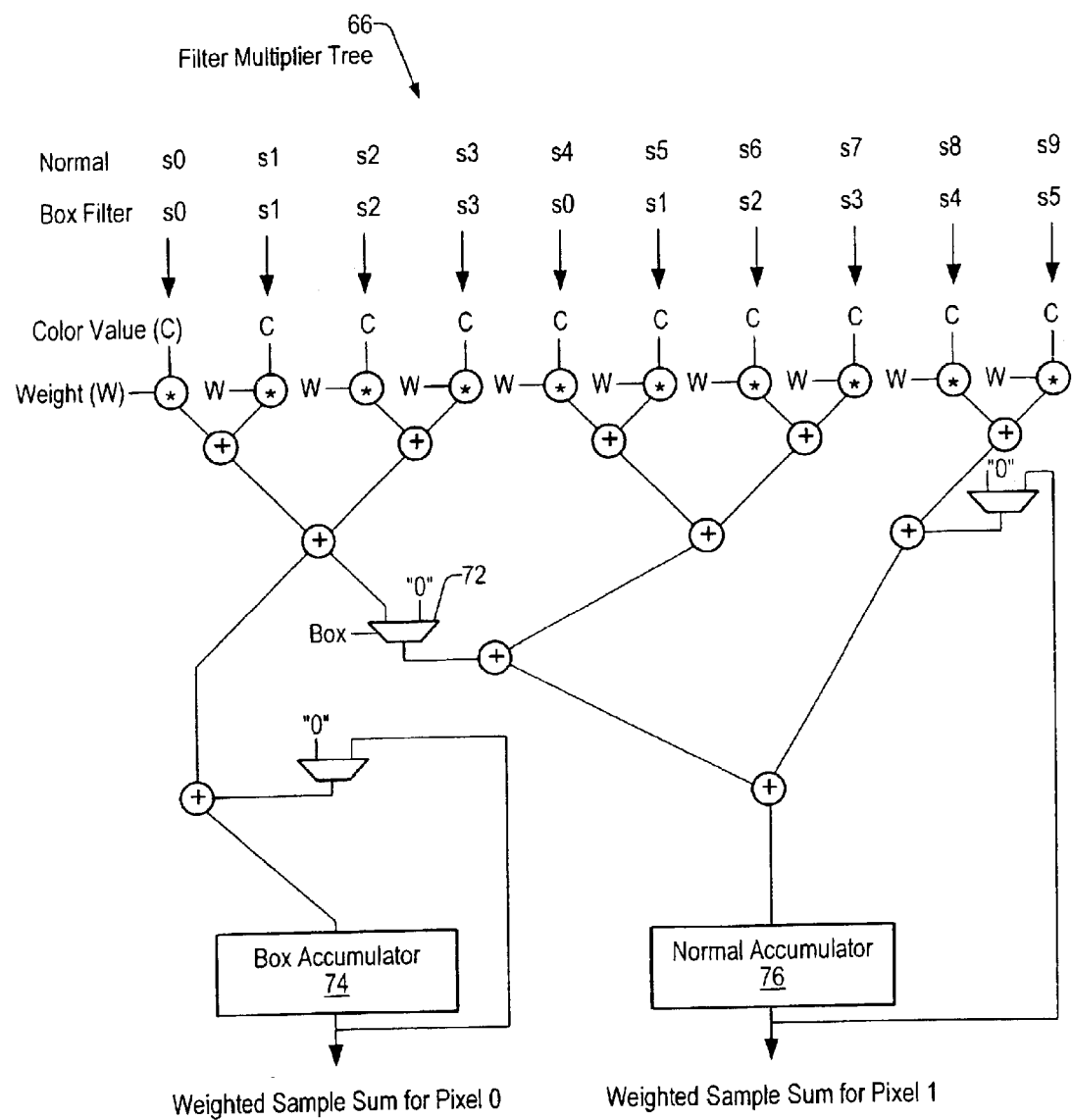
FIG. 14 illustrates the design of one embodiment of a filter multiplier tree.

System for Concurrently Filtering Sequential Pixels—FIGS. 12, 13, & 14

One set of embodiments of a sample filter 172 for concurrently filtering sample data for two sequential pixels (in a scan-line) is illustrated in FIG. 12. The sample filter state machine 54 may have overall control of the sample filtering process and may generate write addresses for the write cache controller 58 and read addresses for the read cache controller 60. The fragment filter queue 56 carries filter instructions from an f clock domain to a g clock domain.

The sample cache 50 may store sample data read from a sample buffer 40 in an array of sample bins. In some embodiments, the sample cache 50 may be configured to store samples in at least an N by N array of sample bins (N is a positive integer). The sample bins correspond to screen space areas, and the samples within a particular sample bin share common maximum possible and minimum possible x and y coordinates.

A control register 62 (also referred to herein as a box filter control register) may specify a number P of sequential pixels to filter concurrently (P is a positive integer). In the set of embodiments shown in FIG. 12, P=2, N=5, and there are multiple samples per bin. If the control register is set to a first value, the sample-to-pixel calculation unit may filter one pixel at a time. If the control register is set to a second value, the sample-to-pixel calculation unit may filter two sequential pixels concurrently and may use a box filter of width 1 for each pixel. The control register 62 may be set in response to user input. In other embodiments, the control register 62 may be set programmatically based on various metrics or conditions.

A read cache controller 60 (also referred to as a sample cache reader) may be configured to read a first set of S samples from the sample cache, and output a second set of S samples (S is a positive integer). The second set of S samples may comprise P subsets of samples, and each subset may be selected from the first set of samples to cover the filter region for one of the P pixels. The combined number of samples in the P subsets may be less than or equal to S. In some embodiments, the read cache controller may be configured to output n times N samples at a time from a row of N sample bins and in this case S=nN (n is a positive integer). This process is detailed in FIGS. 13a and 13b for P=2, N=5, and n=2.

Sample weight calculation unit 64 may determine sample weights for each of the S samples. If a sample position is outside a specified filter radius, the sample weight may be set to zero. If a box filter is specified, and if two times either an x or y component of the separation between a sample position and a pixel location is greater than a box filter width, then the sample weight calculation unit 64 may assign a weight of zero to the sample position.

A filter multiplier tree 66 may be configured to a) receive one or more cycles of S samples grouped in P subsets from the sample cache reader and corresponding S weights from the sample weight calculation unit, b) multiply each sample by the corresponding weight, c) sum the weighted samples for each subset of samples, and d) add the sum to an accumulated sum from prior cycles for each subset. FIG. 14 provides a more detailed representation of the filter multiplier tree 66 for P=2. When processing one pixel at a time, the normal inputs of samples s0 through s9 are received, processed, and accumulated in the normal accumulator 76. When processing two pixels concurrently, two subsets are received. The first subset may have samples s0 through s3, and the second subset may have samples s0 through s5. The multiplexer 72 may separate the filter multiplier tree 66 into two separate units. The two subsets of samples may then be processed separately and accumulated in the box accumulator 74 and the normal accumulator 76. The filter multiplier tree 66 processes the number of cycles of S samples needed to include all samples within the filter regions for each of the P pixels.

A weight accumulator 68 may be configured to receive one or more cycles of S weights from the sample weight calculation unit in P subsets, accumulate a weight sum for the one or more cycles, and calculate a reciprocal of the accumulated weight sum for each subset. The weight accumulator 68 may comprise an adder tree with one or more multiplexers to separate portions of the adder tree (similar to the design of the filter multiplier tree 66).

Two pixel normalizers 70A & 70B may receive the accumulated sum of the weighted samples from the filter multiplier tree and the reciprocal of the accumulated weight sum from the weight accumulator and output the product as a pixel value for each of the two subsets. In some embodiments, one normalizer may be used to output the pixel values in sequence. In other embodiments, P normalizers may be used to output the pixel values concurrently.

Figure 15:
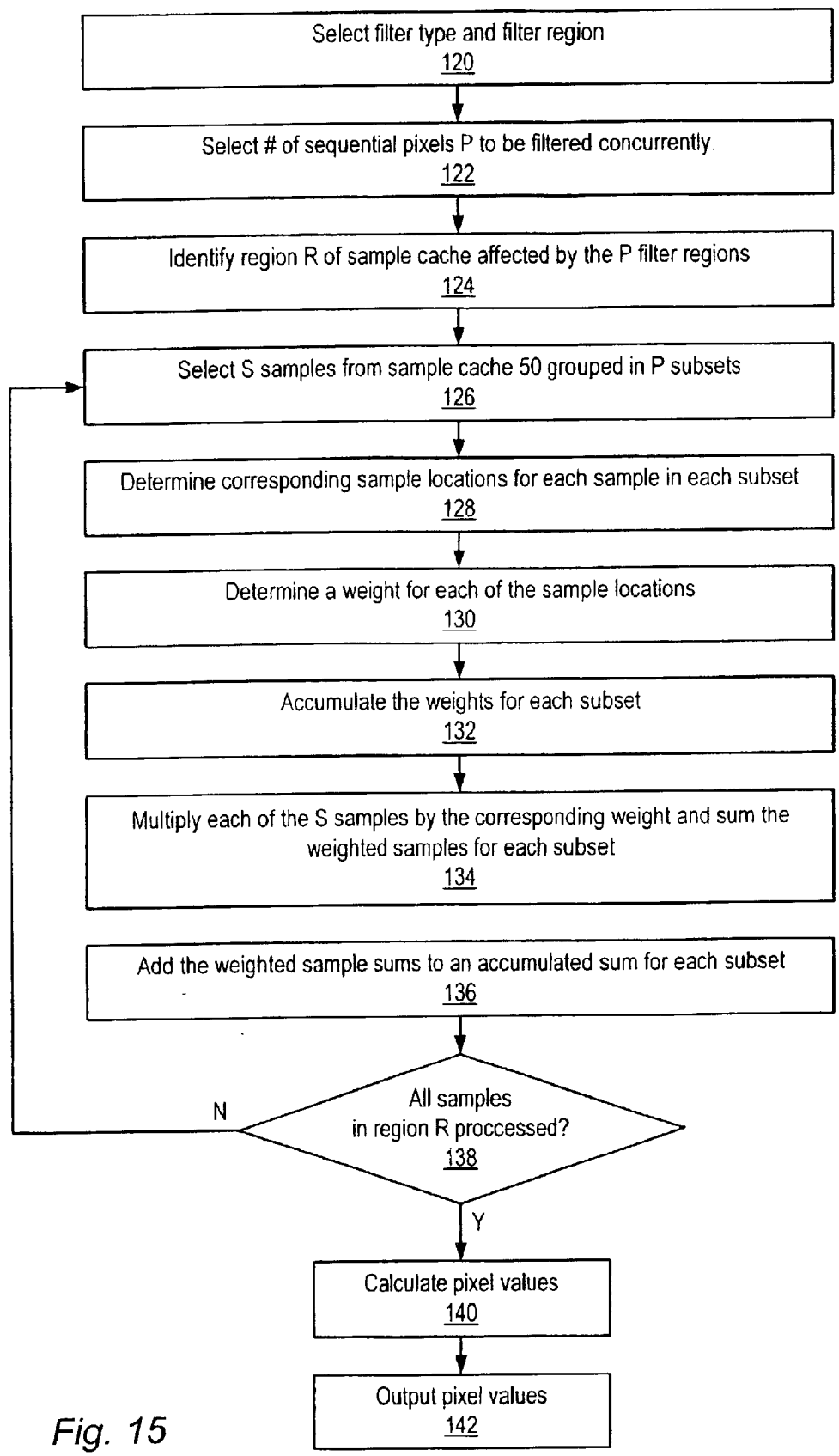
FIG. 15 is a flow diagram that illustrates the method for concurrently filtering sequential pixels.

Method for Concurrently Filtering Sequential Pixels—FIG. 15

The flowchart in FIG. 15 illustrates one embodiment of a method to filter two or more sequential pixels concurrently. The method may be initiated by selecting a filter type and a filter region (step 120), setting a control register 62 to a value that enables concurrent filtering of P sequential pixels (P is a positive integer) (step 122), and identifying a region R (an array A of sample bins) in the sample cache 50 that includes the sample bins intersected by the P filter regions centered on the P sequential pixel locations (step 124).

A user, a host computer, or a graphics processor may specify a filter type and a filter region. The control register may also be set in response to user input. If the control register is set to a first value, the system may filter one pixel at a time using the specified filter. If the control register is set to a second value, the system may filter two sequential pixels concurrently using the specified filter. If the control register is set to a $P^{th}$ value, then the system may filter P sequential pixels concurrently using the specified filter. The sample cache may store samples in an N by N array of sample bins and each sample bin may contain one or more samples (N is a positive integer). The sample bins correspond to screen space areas and the samples within a particular sample bin share common maximum possible and minimum possible x and y coordinates.

A set of S samples may be selected from the array A of sample bins in the sample cache 50 (S is a positive integer). The array A of sample bins may include one or more sets of S samples. Each set of S samples may comprise P subsets of samples corresponding to the P sequential pixels, and each subset may comprise one or more samples from one or more of the sample bins of the array A of sample bins (step 126). A sample includes data for one or more of colors, transparency, depth, and location. The sample cache reader 60 may read n times N samples at a time from a row of N sample bins where n is a positive integer.

In some embodiments, the sample data read from the sample cache 50 may not include sample locations. The sample weights calculation unit 64 may then determine sample locations for each sample in the set of S samples (step 128). Sample locations may be specified according to a pre-selected pattern of sample positions (such as a regular grid, a perturbed regular grid, a stochastic grid, or a specified permutation of a stored set of selected sample locations).

The sample weights calculation unit 64 may determine a weight for each of the S sample locations as a function of the distance between the sample location and the corresponding pixel location, the specified filter type, and the specified filter region (step 130). A weight of zero may be assigned to a sample location that lies outside a specified filter region. The weight may be interpolated from a look-up table. The weight accumulator 68 sums the weights for each subset of samples and accumulates a weight sum after each cycle of S sample locations (step 132).

The filter multiplier tree 66 may multiply each sample value by the corresponding sample weight and sum the weighted samples for each subset (step 134). The filter multiplier tree 66 may add the sum of weighted samples to an accumulated sum for each subset of samples (step 136) after each cycle of S samples. Steps 126 through 136 may be repeated to process S additional samples from the array A of sample bins (step 138), until all samples in array A have been processed. Pixel normalizers 70A & 70B may then calculate pixel values by dividing the accumulated weighted sample sum by the accumulated weight sum for each subset of samples (step 140), and may output pixel values for the P sequential pixels (step 142).

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A sample to pixel filtering system comprising:

a sample cache configured to store samples;

a control register that specifies P sequential pixels to filter concurrently, wherein P is a positive integer;

a sample cache reader configured to read a first set of samples from the sample cache, and output a second set of S samples, wherein the second set of S samples comprises P subsets of samples, each subset is selected from the first set of samples, the combined number of samples in the P subsets is S, and S is a positive integer;

a sample weight calculation unit configured to determine sample weights for the S samples;

a filter multiplier tree configured to a) receive one or more cycles of S samples grouped in P subsets from the sample cache reader and corresponding S weights from the sample weight calculation unit, b) multiply each sample by the corresponding weight, c) sum the weighted samples for each subset of samples, and d) add the sum to an accumulated sum from prior cycles for each subset;

a weight accumulator configured to receive one or more cycles of S weights from the sample weight calculation unit in P subsets, accumulate a weight sum for the one or more cycles, and calculate a reciprocal of the accumulated weight sum for each subset;

a pixel normalizer configured to receive the accumulated sum of the weighted samples from the filter multiplier tree and the reciprocal of the accumulated weight sum from the weight accumulator and output the product as a pixel value for each of the P subsets.

2. The system of claim 1, further comprising a video output unit configured to receive pixel values and display the pixel values on a display device.

3. The system of claim 1, further comprising a graphics processor, a central processing unit, and one or more input devices comprising a keyboard, a mouse, a head-tracking device, and a finger-tracking device to provide user control of the graphical system.

4. A sample to pixel filtering system comprising:

a filter multiplier tree operable to:
  receive one or more cycles of samples and corresponding sample weights;
  multiply each sample by the corresponding weight;
  sum the weighted samples for each of a plurality of specified subsets of the weighted samples; and
  add the sum to an accumulated sum from prior cycles for each subset;

a weight accumulator operable to accumulate a weight sum for each of the subsets for the one or more cycles, and calculate a reciprocal of the accumulated weight sum for each of the subsets; and a pixel normalizer operable to receive the accumulated sum of the weighted samples from the filter multiplier tree and the reciprocal of the accumulated weight sum from the weight accumulator and output the product as a pixel for each of the subsets.

5. The system of claim 4, wherein said operation to sum the weighted samples is performed concurrently for each of the plurality of specified subsets of the weighted samples.

6. The system of claim 4, wherein each of the plurality of specified subsets of the weighted samples correspond to a different pixel.

7. The system of claim 6, wherein the different pixels are sequential.

8. The system of claim 4, further comprising;
a sample cache reader configured to read a first set of samples from a sample cache, and output a second set of samples to the filter multiplier tree; and
wherein the second set of samples comprises two or more subsets of samples, each subset is selected from the first set of samples, and each subset corresponds to a pixel in a sequence of pixels.

9. The system of claim 8, further comprising a sample weight calculation unit configured to determine sample weights for each sample in the second set of samples and output the weights to the filter multiplier tree.

10. The system of claim 4, further comprising a control register that specifies the number of sequential pixels to filter concurrently.

11. The system of claim 10, wherein user input specifies the number of sequential pixels to filter concurrently and the specified number is stored in the control register.

12. The system of claim 11, wherein the number of sequential pixels to filter concurrently is programmable and the number is stored in the control register.

13. The system of claim 4, wherein the filter multiplier tree is separable into two or more independent accumulator sections to accumulate weighted samples for each of the subsets.

14. The system of claim 13, wherein an input signal to each of a plurality of multiplexers controls the separation of the filter multiplier tree into two or more independent accumulator sections.

15. The system of claim 4, further comprising a video output unit configured to receive pixel values and display the pixel values on a display device.

16. The system of claim 4, further comprising;
a graphics processor configured to render and store samples, wherein the sample to pixel filtering system is part of the graphics processor;
a central processing unit connected to the graphics processor, wherein the central processing unit provides control of the graphics processor; and
one or more input devices connected to the central processing unit to provide user input, wherein the input devices comprise one or more of a keyboard, a mouse, a head-tracking device, and a finger-tracking device.

17. A sample to pixel filtering system comprising:
a sample cache;
a sample weight calculation;
a filter multiplier tree configured to:
receive cycles of subsets of samples from the sample cache, and corresponding weights from the sample weight calculation unit;
multiply each sample and corresponding weight;
sum the weighted samples for each subset; and
add the sum to an accumulated sum from prior cycles for each subset;
a weight accumulator configured to accumulate a weight sum for the cycles for each subset, and calculate a reciprocal of the accumulated weight sum; and
a pixel normalizer configured to output the product of the reciprocal of the accumulated weight and the accumulated sum of the weighted samples for each subset.

18. The system of claim 17, further comprising a video output unit configured to receive a sequence of pixels from the pixel normalizer and display the pixel values on a display device.

19. The system of claim 17, further comprising:
a graphics processor configured to render and store samples, wherein the sample to pixel filtering system is part of the graphics processor;
a central processing unit connected to the graphics processor, wherein the central processing unit provides control of the graphics processor; and
one or more input devices connected to the central processing unit to provide user input, wherein the input devices comprise one or more of a keyboard, a mouse, a head-tracking device, and a finger-tracking device.

20. A method for sample to pixel filtering comprising:
in one filter multiplier tree:
receiving one or more cycles of samples and corresponding sample weights;
multiplying each sample by the corresponding weight;
summing the weighted samples for each of a plurality of subsets of the weighted samples; and
adding the sum to an accumulated sum from prior cycles for each subset;
accumulating a weight sum for the one or more cycles for each of the subsets;
calculating a reciprocal of the accumulated weight sum for each of the subsets; and
outputting a pixel for each of the subsets, wherein the pixel is the product of the accumulated sum of the weighted samples and the reciprocal of the accumulated weight sum.

21. The method of claim 20, wherein a sample comprises data for one or more of colors, transparency, depth, and location.

22. The method of claim 20, further comprising:
selecting a filter type and a filter region;
setting a control register to a value that enables concurrent filtering of sequential pixels;
identifying an array of sample bins in a sample cache that overlap the corresponding filter regions centered on the sequential pixel locations;
selecting a set of samples from the array of sample bins in the sample cache, wherein the set of samples comprises subsets of samples corresponding to the sequential pixels, and wherein each subset comprises one or more samples from one or more sample bins of the array of sample bins;
determining corresponding sample locations for each sample in the set of samples; and
determining a weight for each of the sample locations, wherein weights for each subset of samples are determined as a function of the location of the corresponding pixel, the specified filter type, and the specified filter region.

23. The method of claim 22, wherein if the control register is set to a first value, then the system filters one pixel at a time using a specified filter, wherein if the control register is set to a second value, then the system filters two sequential pixels concurrently using a specified filter.

24. The method of claim 23, wherein the control register is set in response to user input.

25. The method of claim 22, wherein if sample locations are not specified as part of the sample data, then sample locations are determined according to one of the following patterns: a regular grid, a perturbed regular grid, a stochastic grid, or a permutation of a stored set of selected sample locations.

26. The method of claim 22, wherein a graphics processor, a host computer, or a user specify a filter type and a filter region.

27. The method of claim 20, wherein said summing the weighted samples is performed independently and concurrently for each of the subsets.

* * * * *